United States Patent [19]
Vollmer et al.

[11] Patent Number: 5,378,016
[45] Date of Patent: Jan. 3, 1995

[54] CONNECTING ELEMENT FOR CONDUIT SEGMENTS THROUGH WHICH HOT FLUE GAS CAN FLOW

[75] Inventors: Wolfgang Vollmer, Erlangen; Werner Kraupa, Fuerth, both of Germany

[73] Assignee: Siemens Aktiengesellschaft, Munich, Germany

[21] Appl. No.: 108,387

[22] Filed: Aug. 18, 1993

[30] Foreign Application Priority Data

Jul. 9, 1993 [DE] Germany .................. 9310270[U]

[51] Int. Cl.$^5$ .................. F16L 27/00; F16L 51/00
[52] U.S. Cl. .................. 285/47; 285/223; 285/187; 285/298
[58] Field of Search .................. 285/47, 223, 224, 187, 285/298, 301

[56] References Cited

U.S. PATENT DOCUMENTS

| | | | |
|---|---|---|---|
| 4,003,210 | 1/1977 | Bostroem | 285/223 |
| 4,406,482 | 9/1983 | Clebant | 285/223 |
| 4,462,618 | 7/1984 | Stone | 285/47 |
| 4,848,803 | 7/1989 | Bachmann | 285/47 |
| 5,199,747 | 4/1993 | Janr | 285/47 |
| 5,209,503 | 5/1993 | Heibel et al. | 285/47 |

FOREIGN PATENT DOCUMENTS

| | | | |
|---|---|---|---|
| 2734188 | 2/1978 | Germany | 285/223 |
| 807336 | 1/1959 | United Kingdom | 285/223 |

*Primary Examiner*—Eric K. Nicholson
*Attorney, Agent, or Firm*—Herbert L. Lerner; Laurence A. Greenberg

[57] ABSTRACT

A conduit assembly, in particular for connecting a flue gas inlet of a gas turbine to a flue gas conduit discharging into a waste heat boiler, includes an outwardly insulated first conduit segment having a supporting inner casing, and an inwardly insulated second conduit segment having a supporting outer casing being radially outwardly offset from the supporting inner casing of the first conduit segment. The supporting casings each have a flange-like structure and are form-lockingly joined together in a connection region between the conduit segments. A connecting element for the conduit segments includes a shaped element surrounding the first conduit segment and being firmly joined to the supporting outer casing of the second conduit segment. The shaped element has a number of radially extending ribs with free ends being form-lockingly joined to the supporting inner casing of the first conduit segment.

8 Claims, 2 Drawing Sheets

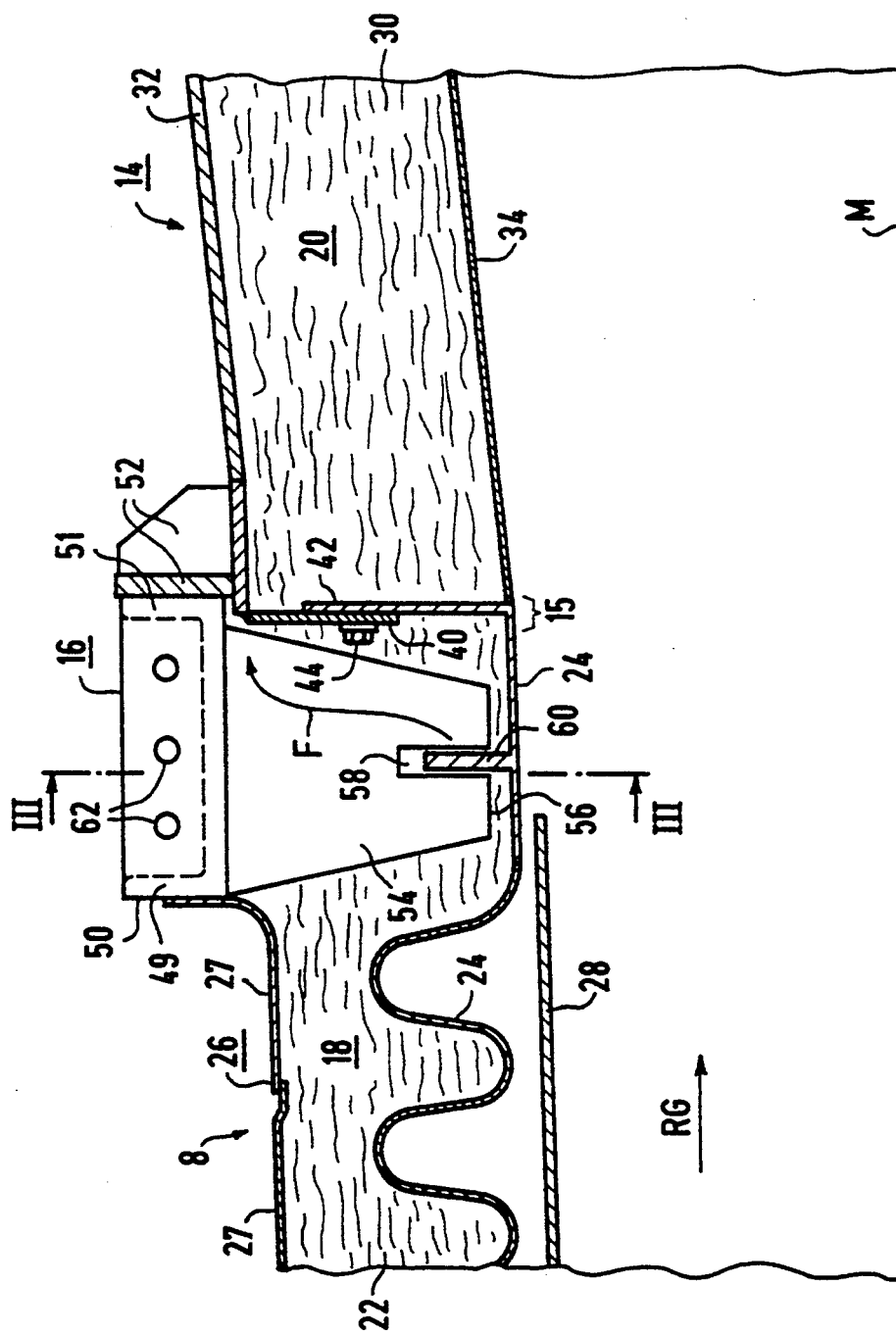

CONNECTING ELEMENT FOR CONDUIT SEGMENTS THROUGH WHICH HOT FLUE GAS CAN FLOW

BACKGROUND OF THE INVENTION

1. Field of the Invention

The invention relates to a connecting element for a first and a second conduit segment, particularly for connecting a flue gas inlet of a gas turbine to a flue gas conduit discharging into a waste heat boiler, wherein the first conduit segment is insulated on the outside and has a supporting or load-bearing inner casing, the second conduit segment is insulated on the inside and has a supporting or load-bearing outer casing being offset radially outwardly from the supporting inner casing of the first conduit segment, and the supporting casings are each constructed in flange-like fashion and are form-lockingly joined together in a connection region between the two conduit segments. A form-locking connection is one which connects two elements together due to the shape of the elements themselves, as opposed to a force-locking connection, which locks the elements together by force external to the elements.

When a gas turbine outlet is joined through an externally insulated metal compensator to an internally insulated diffusor of a flue gas conduit that discharges into a waste heat boiler of a gas and steam turbine system, the supporting outer casing of the internally insulated conduit segment (diffusor) is offset radially outwardly by the thickness of the insulation at the connecting point relative to the supporting inner casing of the externally insulated conduit segment (metal compensator).

When an operationally dictated thermal expansion of the supporting inner casing of the externally insulated conduit segment occurs, the connecting point, which is flue gas-tight and which is formed by a flange-like construction of the supporting casings, is strained and deforms from bending because of the force occurring in the thermal expansion that acts like a lever. The danger then exists that the thin-walled flange-like ends of the supporting casings will be impermissibly deformed or strained.

SUMMARY OF THE INVENTION

It is accordingly an object of the invention to provide a connecting element for two conduit segments through which hot flue gas can flow, which overcomes the hereinafore-mentioned disadvantages of the heretofore-known devices of this general type and with which an operationally safe connection is assured even in the event of alternating thermal strain, without impairing the sealing function.

With the foregoing and other objects in view there is provided, in accordance with the invention, in a conduit assembly for connecting a flue gas inlet of a gas turbine to a flue gas conduit discharging into a waste heat boiler, including an outwardly insulated first conduit segment having a supporting inner casing; and an inwardly insulated second conduit segment having a supporting outer casing being radially outwardly offset from the supporting inner casing of the first conduit segment, the supporting casings each having a flange-like structure and being form-lockingly joined together in a connection region between the conduit segments, a connecting element for the conduit segments, comprising a shaped element surrounding the first conduit segment and being firmly joined to the supporting outer casing of the second conduit segment, the shaped element having a number of radially extending ribs with free ends being form-lockingly joined to the supporting inner casing of the first conduit segment.

As a result, an axial force which begins at the supporting inner part of the externally insulated first conduit segment and which occurs as a result of thermal expansion, is already transmitted upstream of the flange-like connecting point, as seen in the flow direction of the hot flue gas, to the cold supporting outer casing of the internally insulated first conduit segment, through the shaped element. Practically no deforming transfer of force or moment therefore occurs at the flange-like connecting point. If thermal expansion occurs, the flange-like ends of the supporting casings can slide on one another without deformation in the radial direction.

In accordance with another feature of the invention, a radially extending slit is provided at the free end of each rib and is engaged by an adapter that is firmly joined to the supporting inner casing of the first conduit segment. A separate adapter may be provided for each rib. Advantageously, however, one adapter is provided which is common to all of the ribs and which annularly surrounds the supporting inner casing of the first conduit segment.

In accordance with a concomitant feature of the invention, the shaped element is constructed in multiple parts and/or is U-shaped in cross section. Both the part of the shaped element surrounding the externally insulated first conduit segment and the part of the shaped element that is firmly joined to the supporting outer casing of the second conduit segment may be constructed in multiple parts. Together, the parts form a closed ring.

Other features which are considered as characteristic for the invention are set forth in the appended claims.

Although the invention is illustrated and described herein as embodied in a connecting element for conduit segments through which hot flue gas can flow, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a fragmentary, enlarged, longitudinal-sectional view of a portion A of FIG. 1, with a connecting element between two conduit segments, which is taken along a line II—II of FIG. 3, in the direction of the arrows.

DESCRIPTION OF THE PREFERRED EMBODIMENTS

Figure 1:
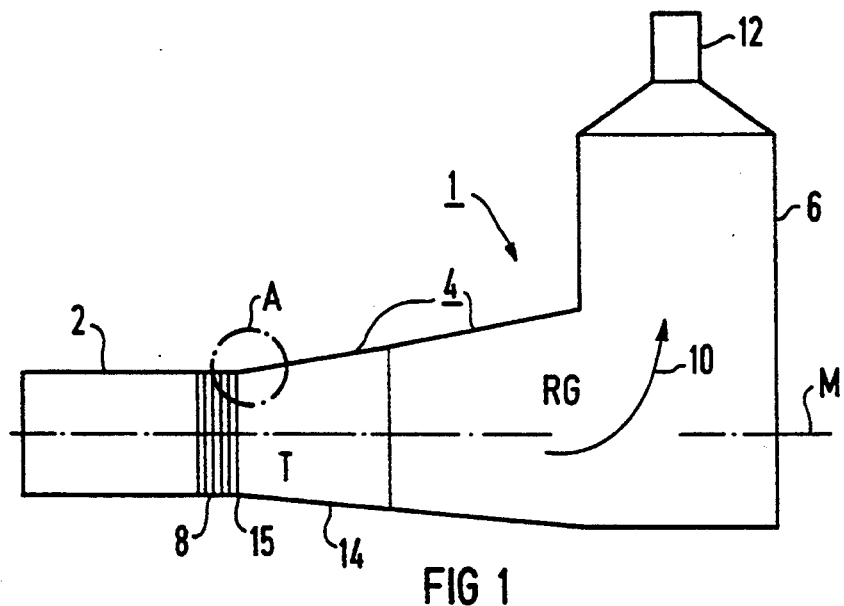
FIG. 1 is a diagrammatic, side-elevational view of a gas turbine with a waste heat boiler connected downstream.

Referring now in detail to the figures of the drawing, in which elements that correspond to one another are identified by the same reference numerals, and first, particularly, to FIG. 1 thereof, there is seen a gas turbine system 1 with a gas turbine 2 connected by a flue gas conduit 4 to a downstream waste heat boiler 6 for steam production, such as for a non-illustrated steam turbine.

Figure 3:
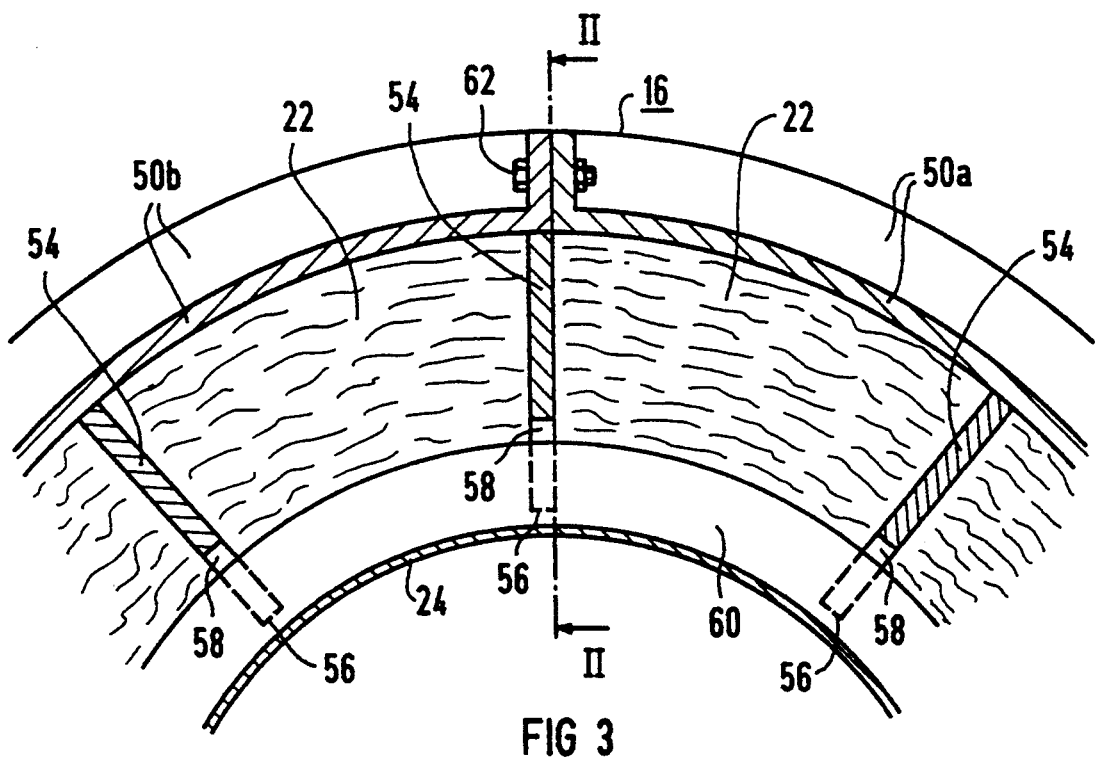
FIGS. 3 is fragmentary, cross-sectional-sectional view of the portion A of FIG. 1, which is taken along a line III—III of FIG. 2, in the direction of the arrows.

During operation of the gas turbine system 1, hot flue gas RG flows through a metal compensator 8 forming an outlet conduit of the gas turbine 2, and through the flue gas conduit 4 into the waste heat boiler 6 in the direction of an arrow 10. The flue gas RG, which is cooled in the waste heat boiler 6 in the process of steam production, leaves the waste heat boiler 6 through a chimney 12. The speed of the hot flue gas RG emerging axially from the gas turbine 2 is decreased in a diffusor 14 that communicates with the metal compensator 8 and forms a flue gas conduit inlet, so that the static flue gas pressure rises. Due to the high outlet temperature T of the hot flue gas RG, which is approximately 500° to 600° C., thermal expansion occurs, which is meant to be compensated for by the metal compensator 8. Although the metal compensator 8 is already prestressed in the cold state, high axial forces occur at a connecting point or in a connection region 15 between the metal compensator 8 and the diffusor 14 because of operationally-dictated thermal expansion of approximately 0.4 m, for example. In order to avoid a thus-dictated deformation at the connection region or connecting point 15, a connecting element 16 is provided as is shown in FIGS. 2 and 3. FIG. 2 shows a longitudinal section through a portion of a wall located above a center axis M of the metal compensator 8 and of the flue gas conduit 4.

The metal compensator 8, a portion of which is shown in FIG. 2, forms a first conduit segment 18. The diffusor 14, a portion of which is also shown, forms a second conduit segment 20. The first conduit segment 18 is provided with an outer insulation 22 and has a supporting or load-bearing inner casing 24 constructed in undulating or corrugated fashion. Above the outer insulation 22, a thin covering part 26 with plates 27 that can be displaced relative to one another is provided. Below the supporting inner casing 24, a guide plate 28 for the hot flue gas RG is provided.

The second conduit segment 20 is provided with an inner insulation 30 and has a supporting or load-bearing outer casing 32. Below the inner insulation 30, a thin covering part 34 is provided.

The supporting casings 24 and 32 of the respective conduit segments 18 and 20 are flange-like in construction at the connecting part. Flange-like ends 40 and 42 of the respective supporting casings 24 and 32 are joined together in the form of a slip connection. To that end, a screw 44 is guided in a non-illustrated radially extending oblong slot, so that if radial forces occur as a result of thermal expansion, the ends 40 and 42 can slide on one another.

The connecting element 16 serving to connect the conduit segments 18, 20 has a shaped element 50 with a U-shaped cross section, that annularly surrounds the outer insulation 22 of the first conduit segment 18. It is firmly joined to the supporting outer casing 32 of the second conduit segment 20 by an L-shaped annular flange 52. Outwardly-pointing legs of the U-shaped element 50 are identified by reference numerals 49 and 51. The shaped element 50 has a number of radially extending ribs 54, having free ends 56 being form-lockingly joined to the supporting inner casing 24 of the first conduit segment 18. To that end, a radially extending slit 58 is provided in the free end 56 of the each rib 54, and this slit is engaged by an adapter 60 that is firmly joined to the supporting inner casing 24 of the first conduit 18. A separate adapter 60 that can slide in the radial direction in the slit 58 may be provided for each rib 54.

As is shown in FIG. 3, the adapter 60, which is preferably common to all of the ribs 54, surrounds the supporting inner casing 24 of the first conduit segment 18 in annular fashion. The shaped element 50 is constructed in multiple parts, and individual parts 50a, 50b are joined together by screws 62 to form a closed ring. However, the shaped element 50 may also be made in one piece.

Axial forces that arise from thermal expansion are already transmitted upstream of the connecting point 15, as viewed in the flow direction of the flue gas RG, by the shaped element 50 of the connecting element 16 in the direction of an arrow F, beginning at the supporting inner casing 24 of the first conduit segment 18 and leading to the cold, supporting outer casing 32 of the conduit segment 20. As a result, a bending strain or shearing of the flange-like ends 40 and 42 of the supporting casings 24 and 32 is avoided, so that the flange-like ends 40 and 42 can slide on one another without a deforming strain in the radial direction.

We claim:

1. In a conduit assembly including:
   an outwardly insulated first conduit segment having a supporting inner casing; and
   an inwardly insulated second conduit segment having a supporting outer casing being radially outwardly offset from the supporting inner casing of the first conduit segment,
   the supporting casings each having a flange-like structure and being joined together in a connection region between the conduit segments,
   a connecting element for the conduit segments, comprising:
   a shaped element surrounding the first conduit segment and being firmly joined to the supporting outer casing of the second conduit segment, said shaped element having a plurality of radially extending ribs with free ends being form lockingly joined to the supporting inner casing of the first conduit segment.

2. The connecting element according to claim 1, including adapters being firmly joined to the supporting inner casing of the first conduit segment, each of said adapters engaging a respective one of radially extending slits each being formed in said free end of a respective one of said ribs.

3. The connecting element according to claim 1, including an adapter being firmly joined to and annularly surrounding the supporting inner casing of the first conduit segment, said adapter engaging radially extending slits each being formed in said free end of a respective one of said ribs.

4. The connecting element according to claim 1, wherein said shaped element has multiple individual parts connected together to form a closed ring.

5. The connecting element according to claim 1, wherein said shaped element has a U-shaped profile as seen in cross section.

6. The connecting element according to claim 1, wherein the supporting casings have flange-like ends being secured to one another and sliding on one another upon thermal expansion in the radial direction.

7. The connecting element according to claim 1, wherein the first conduit segment is a gas turbine outlet, and the second conduit segment is a flue gas conduit inlet.

8. In a conduit assembly for connecting a flue gas inlet of a gas turbine to a flue gas conduit discharging into a waste heat boiler, including:
   an outwardly insulated first conduit segment having a supporting inner casing; and
   an inwardly insulated second conduit segment having a supporting outer casing being radially outwardly offset from the supporting inner casing of the first conduit segment,
   the supporting casings each having a flange-like structure and being joined together in a connection region between the conduit segments,
   a connecting element for the conduit segments, comprising:
   a shaped element surrounding the first conduit segment and being firmly joined to the supporting outer casing of the second conduit segment, said shaped element having a plurality of radially extending ribs with free ends being form lockingly joined to the supporting inner casing of the first conduit segment.

* * * * *